United States Patent
Jalloul et al.

(10) Patent No.: US 9,209,876 B2
(45) Date of Patent: Dec. 8, 2015

(54) ADAPTIVE TRANSMIT BEAMFORMING

(75) Inventors: Louay Jalloul, San Jose, CA (US);
Bertrand Hochwald, South Bend, IN (US)

(73) Assignee: Broadcom Corporation, Irvine, CA (US)

( * ) Notice: Subject to any disclaimer, the term of this patent is extended or adjusted under 35 U.S.C. 154(b) by 686 days.

(21) Appl. No.: 13/341,624

(22) Filed: Dec. 30, 2011

(65) Prior Publication Data
US 2013/0170573 A1    Jul. 4, 2013

(51) Int. Cl.
*H04B 7/02*       (2006.01)
*H04B 7/04*       (2006.01)
*H04B 7/06*       (2006.01)

(52) U.S. Cl.
CPC ............ *H04B 7/0465* (2013.01); *H04B 7/0617* (2013.01)

(58) Field of Classification Search
CPC ............................ H04B 7/0617; H04B 7/0465
USPC ................................. 375/260, 267, 340, 259
See application file for complete search history.

(56) References Cited

U.S. PATENT DOCUMENTS

| | | | | |
|---|---|---|---|---|
| 7,453,948 B2 * | 11/2008 | Kim et al. | ...................... | 375/267 |
| 8,112,038 B2 | 2/2012 | Li et al. | | |
| 8,331,478 B2 * | 12/2012 | Harrison et al. | .............. | 375/267 |
| 8,451,951 B2 * | 5/2013 | Caire et al. | .................... | 375/340 |
| 2005/0047517 A1 * | 3/2005 | Georgios et al. | .............. | 375/267 |
| 2005/0078763 A1 * | 4/2005 | Choi et al. | ...................... | 375/267 |
| 2006/0209980 A1 * | 9/2006 | Kim et al. | ...................... | 375/267 |
| 2009/0304128 A1 * | 12/2009 | Izumi et al. | ................... | 375/343 |
| 2010/0142633 A1 * | 6/2010 | Yu et al. | ....................... | 375/260 |
| 2011/0150114 A1 * | 6/2011 | Miao et al. | ..................... | 375/260 |
| 2013/0243110 A1 * | 9/2013 | Skov et al. | ..................... | 375/267 |

FOREIGN PATENT DOCUMENTS

| | | |
|---|---|---|
| CN | 1764083 A | 4/2006 |
| CN | 101826932 A | 9/2010 |
| EP | 1487133 A1 | 12/2004 |
| EP | 2140595 B1 | 11/2011 |

OTHER PUBLICATIONS

Bernhard Schulz("LTE Transmission Modes and Beamforming", Oct. 2011—1MA186-0e, pp. 1-20, Rohde & Schwarz GmbH & Co. KG.*
Office Action directed to related Chinese Patent Application No. 201210549534.0, dated Mar. 19, 2015; 5 pages.

(Continued)

*Primary Examiner* — Shuwang Liu
*Assistant Examiner* — Helene Tayong
(74) *Attorney, Agent, or Firm* — Sterne, Kessler, Goldstein & Fox P.L.L.C.

(57) ABSTRACT

Embodiments of a method and apparatus for selecting one of several different power constraints under which sets of complex, beam weights are normalized are described herein. The embodiments of the method and apparatus specifically select the power constraint based on a code rate used to encode information carried by a transmit signal weighted by the sets of complex, beam weights. Appropriate selection of the power constraint can improve the bit error rate (BER) or block error rate (BLER) of the decoded transmit signal at a receiver.

17 Claims, 6 Drawing Sheets

(56) References Cited

OTHER PUBLICATIONS

English-Language Abstract for Chinese Patent Publication No. 1764083 A, published Apr. 26, 2006; 1 page.

English-Language Abstract for Chinese Patent Publication No. 101826932 A, published Sep. 8, 2010; 1 page.

* cited by examiner

ADAPTIVE TRANSMIT BEAMFORMING

FIELD OF THE INVENTION

This application relates generally to beamforming and, more particularly to, adaptive transmit beamforming.

BACKGROUND

Transmit beamforming is a signal processing technique that uses two or more antennas at a transmitter to increase the signal to interference plus noise ratio (SINR) at a receiver and, thereby, the rate at which data can be communicated from the transmitter to the receiver. The basic operation of transmit beamforming is to send the same signal to the receiver from each of the two or more antennas. However, a different beam weight (or set of beam weights) is applied to the signal sent from each antenna.

In order to improve the SINR at the receiver, the values of the different beam weights (or sets of beam weights) are not arbitrarily chosen. Rather, they are determined based on knowledge of the wireless channel used to convey the signal between the transmitter and the receiver. Once determined, the different beam weights (or sets of beam weights) can be normalized to ensure a fixed overall transmit power from the transmitter. However, normalization can be performed in several different ways (based on different power constraints) and, depending on the method of normalization used, the bit error rate (BER) or block error rate (BLER) of the data sent to and decoded at the receiver can vary.

Therefore, what is needed is a method and apparatus for selecting the normalization technique used to normalize the different beam weights (or sets of beam weights) in order to improve the BER or BLER of the data decoded at the receiver.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

The present invention will be described with reference to the accompanying drawings. The drawing in which an element first appears is typically indicated by the leftmost digit(s) in the corresponding reference number.

DETAILED DESCRIPTION

Figure 1:
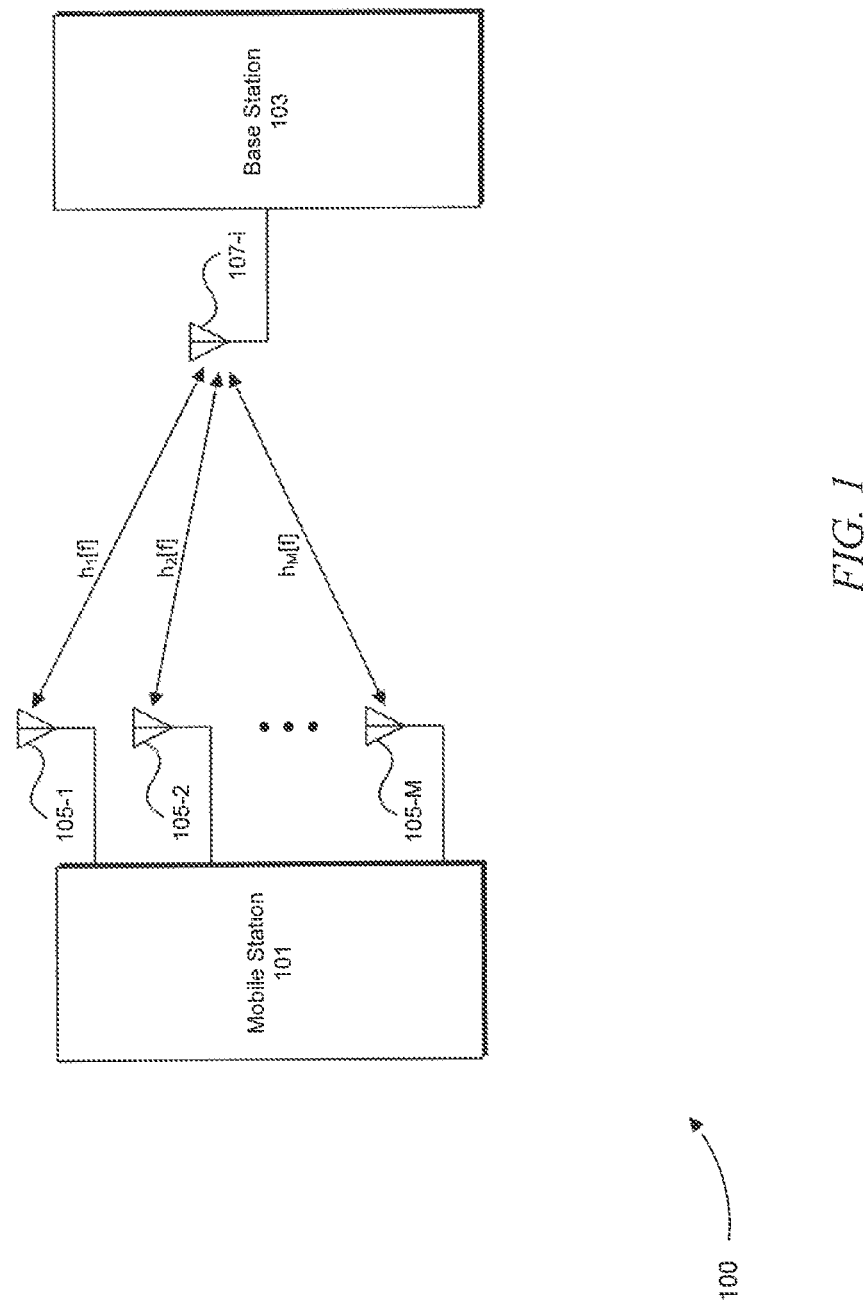
FIG. 1 illustrates an exemplary wireless communication system in which embodiments of the preset invention can be implemented.

In the following description, numerous specific details are set forth in order to provide a thorough understanding of the invention. However, it will be apparent to those skilled in the art that the invention, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the invention.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Various aspects are described herein in connection with a terminal, which can also be referred to as a subscriber unit, subscriber station, mobile station, mobile device, remote station, remote terminal, access terminal, user terminal, terminal, user device, or user equipment, for example.

1. Overview

The various embodiments of the present invention described herein are applicable to multi-carrier communication systems and, in particular, to orthogonal frequency division multiplexing (OFDM) communication systems. In order to facilitate a better understanding of these various embodiments described in the sections below, the basic principles of OFDM transmission and beamforming as applied to OFDM transmission are first reviewed here.

In general, OFDM is a multicarrier communication scheme that transmits data over F orthogonal tones (or subcarriers). Before transmission, the data is mapped to a series of complex symbols (e.g., QAM or QPSK symbols), referred to as source symbols, and divided into F parallel symbol streams. The F parallel symbol streams are treated as though they are in the frequency-domain and are used as inputs to an inverse fast Fourier transform (IFFT) block that transforms them into the time-domain. The IFFT block specifically takes in F source symbols at a time, one from each of the F parallel symbol streams, and uses each to modulate the amplitude and phase of a different one of F sinusoidal basis functions that correspond to the F orthogonal tones. The output of the IFFT block is F time-domain samples that represent the summation of the F orthogonal tones. The F time-domain samples form a single OFDM symbol. After some additional processing and up-conversion, the OFDM symbol (and others) provided by the IFFT block are transmitted across a channel, using an antenna, to an OFDM receiver.

To perform beamforming in an OFDM transmitter, the same OFDM symbols are transmitted from two or more antennas. However, a different set of beam weights is applied to the OFDM symbols before they are sent. More specifically, each of the two or more antennas has a dedicated IFFT block (or a dedicated time slice of a time-multiplexed IFFT block) and each IFFT block receives the same F source symbols from which to generate an OFDM symbol. However, prior to each IFFT block receiving the same F source symbols, a beamformer applies a different set of beam weights to each copy. The sets of beam weights include F complex weights, one for each symbol of the F source symbols, and are used by the beamformer to adjust the respective magnitudes and phases of the F source symbols.

In order to improve the SINK at an intended receiver using transmit beamforming, the values of the different sets of beam weights are determined based on knowledge of the wireless channel used to convey the OFDM symbols between the transmitter and the receiver. Once determined, the different sets of beam weights can be normalized to ensure a fixed overall transmit power from the OFDM transmitter. However, normalization can be performed in several different ways (based on different power constraints) and, depending on the method of normalization used, the bit error rate (BER) or block error rate (BLER) of the data sent to and decoded at the receiver can vary.

The present invention is directed to a method and apparatus for normalizing the different sets of beam weights in order to improve the BER or BLER of the data sent to and decoded at the receiver. Before describing further details of the method and apparatus, the discussion below begins by providing an exemplary operating environment in which embodiments of the present invention can be implemented.

2. Example Operating Environment

FIG. 1 illustrates an exemplary wireless communication system 100 in which embodiments of the present invention can be implemented. As illustrated in FIG. 1, exemplary wireless communication system 100 includes a mobile station 101 (e.g., a mobile phone, laptop, pager, etc.) and a base station 103 that are configured to communicate with each other using a wireless network technology. For example, mobile station 101 and base station 103 can communicate with each other using one of the following wireless network technologies: Long Term Evolution (LTE), Institute of Electrical and Electronic Engineers (IEEE) 802.16e (WiMAX), and IEEE 802.11 (Wi-Fi).

In operation, base station 103 is generally configured to act as an access point to connect mobile station 101 to a wired network (not shown) by relaying data between mobile station 101 and the wired network. To improve the SINR at base station 103 and, thereby, the rate at which data can be communicated to base station 103, mobile station 101 includes multiple antennas, 105-1 through 105-M, and uses these antennas to perform transmit beamforming. Mobile station 101 specifically performs transmit beamforming by sending the same transmit signal from each antenna, 105-1 through 105-M, albeit with a different set of beam weights applied to the signal sent from each antenna.

The different sets of beam weights are determined based on knowledge of the wireless channel used to convey the transmit signal between the two stations. Mobile station 101 acquires information about the wireless channel using, for example, known training sequences (e.g., in the form of preambles or pilot tones) sent to it by base station 103 (assuming a time division duplex (TDD) system in which the channels used to send and receive information between the two stations are reciprocal) or by using explicit feedback from base station 103 containing information about the channels. The wireless channel can be expressed as an N×M channel matrix H[f], where N is the number of antennas at base station 103 and M is the number of antennas at mobile station 101.

If complete knowledge of the channel matrix H[f] is obtained and available at mobile station 101, the different beam weights (or sets of beam weights) can be determined by performing singular value decomposition on the channel matrix H[f]. Often, however, only partial knowledge of the channel matrix H[f] is obtained and available at mobile station 101. For example, base station 103 can send a training sequence using only one available antenna, or using cyclic delay diversity (CDD) using N available antennas.

If base station 103 uses only one antenna, such as antenna 107-$i$ as illustrated in FIG. 1, to send a known training sequence, mobile station 101 can determine an M×1 channel vector, where each value of the M×1 channel vector corresponds to the frequency response between a different one of the M antennas at mobile station 101 and antenna 107-$i$ at base station 103 from which the training sequence was sent. If the training sequence is sent using CDD from N antennas (not shown) available at base station 103, mobile station 101 can similarly determine an M×1 channel vector. However, each value of the M×1 channel vector in this instance corresponds to the frequency response between a different one of the M antennas at mobile station 101 and a virtualized antenna (formed using CDD) at base station 103 from which the training sequence was sent. Thus, using either method, mobile station 101 obtains an M×1 channel vector.

The M×1 channel vector can be expressed as:

$$\tilde{h}[f]=[\tilde{h}_1[f]\tilde{h}_2[f]\ldots\tilde{h}_M[f]] \quad (1)$$

where $\tilde{h}_1[f]$ through $\tilde{h}_M[f]$ each describe the frequency response between a different one of the M antennas at mobile station 101 and antenna 107-$i$, or a virtualized antenna, at base station 103.

Figure 2:
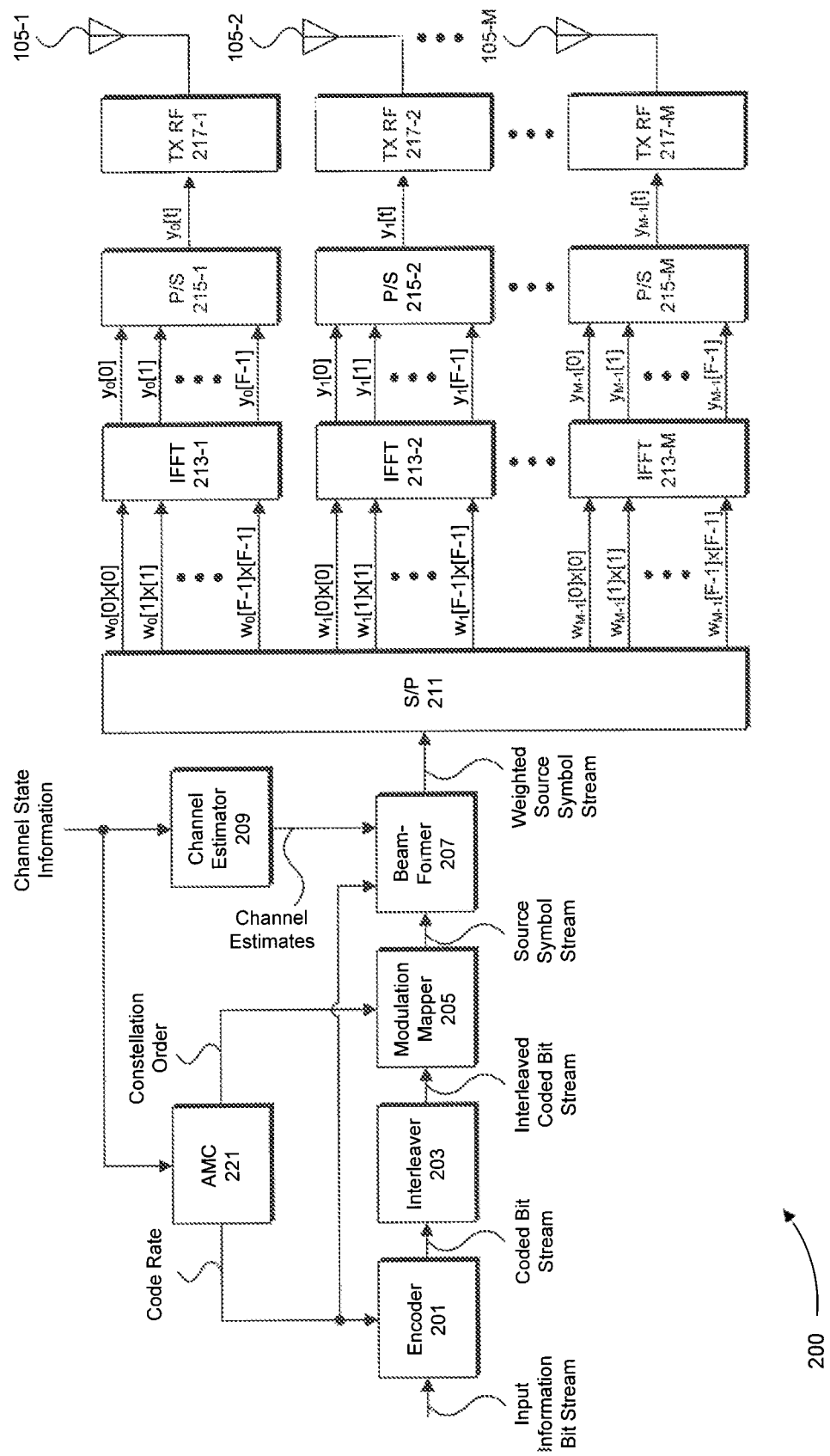
FIG. 2 illustrates an exemplary transmitter in accordance with embodiments of present invention.

Referring now to FIG. 2, an example transmitter 200 that can be implemented in mobile station 101 is illustrated in accordance with an embodiment of the present invention. Transmitter 200 uses an OFDM encoding scheme, as described above, for transmitting data over a large number of orthogonal tones.

In operation, encoder 201 receives an input information bit stream (e.g., a voice, video, or any other application or program specific information bit stream) destined for transmission. Encoder 201 adds redundant data to the input information bit stream to produce a coded bit stream. The redundant data is a function of the original bits of the input information bit stream and allows the receiving system to detect and correct for errors caused by corruption from the channel and the receiving system. The total amount of useful information sent (i.e. non-redundant data) is typically defined by the code rate, k/n; for every k bits of useful information (i.e., the original bits of the input information bit stream), n bits of data are generated. Encoder 201 can encode the input data stream using, for example, low-density parity check (LDPC) encoding or turbo encoding.

After encoding, interleaver 203 rearranges the coded bit stream to produce an interleaved coded bit stream. Rearranging of the coded bit stream mitigates the effects of burst errors that can occur during transmission and reception by "spreading" errors out over the coded bit stream.

Modulation mapper 205 subsequently gathers the bits of the interleaved coded bit stream into groups and maps the groups to a series of complex symbols, referred to as source symbols, using any one of a number of different digital modulation techniques, including quadrature amplitude modulation (QAM) and quadrature phase shift keying (QPSK). The number of bits in each group dictates the constellation size of the digital modulation technique used. For example, if groups of six bits are formed, then the constellation of the digital modulation scheme includes at least $2^6$ or 64 different complex symbols.

One or more of the constellation size and code rate (used by modulation mapper 205 and encoder 201, respectively) can be fixed in transmitter 200 or, alternatively, can be adaptively updated by adaptive modulation and coder (AMC) 221. In general, AMC 221 is configured to adaptively change the constellation size used by modulation mapper 205 and/or the code rate used by encoder 201 based on feedback from the intended receiver, which in this instance is base station 103. The feedback can provide some measure of the quality of the channel (e.g., a data rate that can be supported by the channel) used to convey information to base station 103. If, for example, the quality of the channel improves, AMC 221 can increase one or more of the constellation size used by mapper 205 and/or increase the code rate used by encoder 201. Similarly, if the quality of the channel deteriorates, AMC 221 can decrease one or more of the constellation size used by mapper 205 and/or decrease the code rate used by encoder 201.

Ignoring beamformer 207 for the moment, the serial stream of source symbols provided by modulation mapper 205 would be received next by S/P module 211. S/P module 211 divides the serial stream of source symbols into F parallel symbol streams. The F parallel symbol streams are treated as though they are in the frequency-domain and are used as inputs to a series of inverse fast Fourier transform (IFFT) blocks 213-1 through 213-M (or as inputs to one IFFT block that is time-multiplexed) that transform them into the time-domain. In other words, each of IFFT blocks 213-1 through 213-M receives a copy of the same F parallel symbol streams. IFFT blocks 213-1 through 213-M take in F source symbols at a time (labeled x[0]-x[F-1] in FIG. 2), one from each of the F parallel symbol streams, and use each of the F symbols to modulate the amplitude and phase of a different one of F orthogonal sinusoidal basis functions (referred to as tones). Each IFFT block provides F time-domain samples (labeled y[0]-y[F-1] in FIG. 2) as output that represent the summation of the F orthogonal sinusoidal basis functions after having been respectively modulated by the F source symbols. The F time-domain samples from each IFFT block form a single OFDM symbol and are respectively serialized by P/S modules 215-1 through 215-M, up-converted to a carrier frequency by TX RF modules 217-1 through 217-M, and transmitted by antennas 105-1 through 105-M.

Considering beamformer 207 now, beamformer 207 applies a different set of beam weights to the OFDM symbols before they are transmitted by antennas 105-1 through 105-M. More specifically, prior to each IFFT block 213-1 through 213-M receiving the same F source symbols from S/P module 211, beamformer 207 applies a different set of beam weights to each copy. The sets of beam weights include F complex weights, one for each of the F source symbols, and are used by beamformer 207 to adjust the respective magnitudes and phases of the F source symbols. For example, beamformer 207 respectively applies the set of beam weights $w_0[0]$-$w_0[F-1]$ to the F source symbols x[0]-x[F-1] that IFFT block 213-1 receives. Similarly, beamformer 207 applies the set of beam weights $w_1[0]$-$w_1[F-1]$ to the F source symbols x[0]-x[F-1] that IFFT block 213-2 receives. The weights are complex values.

In order to improve the SINR at base station 103 (i.e., the intended receiver) using transmit beamforming, the values of the different sets of beam weights ($w_0[f]$-$w_{M-1}[f]$, where f=0, 1, ..., F-1) are determined by beamformer 207 based on knowledge of the wireless channel used to convey the transmit signal between wireless transmitter 200 and base station 103. Channel estimator 209 is configured to acquire this information about the wireless channel using, for example, known training sequences (e.g., in the form of preambles or pilot tones) sent to it by base station 103 (assuming a time division duplex (TDD) system in which the channel used to send and receive information between the two stations are reciprocal) or by using explicit feedback from base station 103 containing information about the channel. The received training sequences and/or explicit feedback are denoted in FIG. 2 as channel state information.

In an embodiment, base station 103 sends a training sequence to wireless transmitter 200 using only one available antenna, or using cyclic delay diversity (CDD) using N available antennas, and channel estimator 209 determines an M×1 channel vector based on this training sequence. The M×1 channel vector was expressed above in Eq. 1 and is reproduced below:

$$\tilde{h}[f]=[\tilde{h}_1[f]\tilde{h}_2[f]\ldots\tilde{h}_M[f]] \quad (1)$$

where $\tilde{h}_1[f]$ through $\tilde{h}_M[f]$ each describe the frequency response of the channel between a different one of the M antennas 105-1 through 105-M at transmitter 200 and an antenna, or a virtualized antenna, at base station 103. Beamformer 207 can then determine the different sets of beam weights ($w_0[f]$-$w_{M-1}[f]$, where f=0, 1, ..., F-1) based on this M×1 channel vector. In particular, and in at least one embodiment, beamformer 207 determines the set of beam weights $w_0[f]$ to be equal to the complex conjugate of $\tilde{h}_1[f]$, the set of beam weights $w_1[f]$ to be equal to the complex conjugate of $\tilde{h}_2[f]$, the set of beam weights $w_2[f]$ to be equal to the complex conjugate of $\tilde{h}_3[f]$, etc.

Regardless of the exact method in which the sets of complex weights, $w_0[f]$ through $w_{M-1}[f]$, are obtained, the sets of complex weights can be normalized to ensure a fixed overall transmit power from mobile station 101. However, normalization can be performed in several different ways (based on different power constraints) and, depending on the method of normalization used, the bit error rate (BER) or block error rate (BLER) of the decoded bit stream at base station 103 can vary.

Described in the sections below are the different normalization techniques and an apparatus and method for selecting one of these normalization techniques such that the BER or BLER of the decoded bit stream at base station 103 (i.e., at the intended receiver) is improved.

3. Normalization

3.1 Power Sharing Among Transmit Antennas

Assuming that the fixed overall transmit power of wireless transmitter 200 can be shared among antennas 105-1 through 105-M in various proportions, then the sets of complex weights, $w_0[f]$ through $w_{M-1}[f]$ (where f=0, 1, ..., F-1) can be normalized under two different power constraints: (1) a per-symbol (PS) power constraint; and (2) a per-tone (PT) power constraint.

Under the PS power constraint, the sets of complex weights, $w_0[f]$ through $w_{M-1}[f]$, are normalized such that the average power of the tones of the OFDM symbols transmitted from antennas 105-1 through 105-M is constrained to be a constant. Just as important, under the PS power constraint, the sets of complex weights, $w_0[f]$ through $w_{M-1}[f]$, are normalized such that the average power of the tones of an OFDM symbol transmitted from any one of antennas 105-1 through 105-M is not (necessarily) constrained to be a constant, nor is the power of any tone of an OFDM symbol transmitted from any of antennas 105-1 through 105-M (necessarily) constrained to be a constant. The complex sets of weights, $w_0[f]$ through $w_{M-1}[f]$, normalized under the PS power constraint can be expressed, for example, as a vector $W[f]$ as follows:

$$W[f] = \begin{bmatrix} w_0[f] \\ \vdots \\ w_{M-1}[f] \end{bmatrix} = \sqrt{F} \frac{\tilde{h}^*[f]}{\sqrt{\sum_{f=0}^{E} \|\tilde{h}[f]\|^2}}, \quad (2)$$

$$f = 0, 1, \ldots, F-1$$

such that the following expression of the PS power constraint is met:

$$\sum_{f=0}^{F-1} \|W[f]\|^2 = F \quad (3)$$

where $W[f]$ is a vector composed of the sets of complex weights and is given by $W^T[f]=[w_0[f] \, w_1[f] \ldots w_{M-1}[f]]$, $R[f]$ is the M×1 channel vector expressed in Eq. 1 (the complex conjugate of which is used here for exemplary purposes only as the non-normalized sets of beam weights), and F is the number of tones in an OFDM symbol.

Under the PT power constraint, the sets of complex weights, $w_0[f]$ through $w_{M-1}[f]$, are normalized such that the power of each of the tones of an OFDM symbol transmitted from any one of antennas 105-1 through 105-M is constrained to be a constant. Just as important, under the PT power constraint, the sets of complex weights, $w_0[f]$ through $w_{M-1}[f]$, are normalized such that the average power of the tones of an OFDM symbol, transmitted from any one of antennas 105-1 through 105-N, is not (necessarily) constrained to be a constant. The complex sets of weights, $w_0[f]$ through $w_{M-1}[f]$, normalized under the PT power constraint can be expressed, for example, as a vector $W[f]$ as follows:

$$W[f] = \begin{bmatrix} w_0[f] \\ \vdots \\ w_{M-1}[f] \end{bmatrix} = \frac{\tilde{h}*[f]}{\|\tilde{h}[f]\|}, \quad (4)$$

$$f = 0, 1, \ldots, F-1$$

such that the following expression of the PT power constraint is met:

$$\|W[f]\|^2 = 1 \quad (5)$$

where $W[f]$ is a vector composed of the sets of complex weights and is given by $W^T[f]=[w_0[f] \, w_1[f] \ldots w_{M-1}[f]]$, $\tilde{h}[f]$ is the M×1 channel vector expressed in Eq. 1 (the complex conjugate of which is used here for exemplary purposes only as the non-normalized sets of beam weights), and F is the number of tones in an OFDM symbol.

3.2 No Power Sharing Among Transmit Antennas

Assuming that the fixed overall transmit power of wireless station 200 cannot be shared among antennas 105-1 through 105-M in various proportions (i.e., each antenna is constrained to a fixed proportion of the transmit power available at wireless station 200), then the sets of complex weights, $w_0[f]$ through $w_{M-1}[f]$ (where f=0, 1, . . . , F−1), can be normalized under two different power constraints: (1) a per-symbol, per-antenna (PSPA) power constraint; and (2) a per-tone, per-antenna (PTPA) power constraint.

Under the PSPA power constraint, the sets of complex weights, $w_0[f]$ through $w_{M-1}[f]$, are normalized such that the average power of the tones of an OFDM symbol transmitted from any one of antennas 105-1 through 105-M is constrained to be a constant. Just as important, under the PSPA power constraint, the sets of complex weights, $w_0[f]$ through $w_{M-1}[f]$, are normalized such that the power of the tones of an OFDM symbol transmitted from at least one of antennas 105-1 through 105-M is not (necessarily) constrained to be a constant. The complex sets of weights, $w_0[f]$ through $w_{M-1}[f]$, normalized under the PSPA power constraint can be expressed, for example, as a vector $W[f]$ as follows:

$$W[f] = \begin{bmatrix} w_0[f] \\ \vdots \\ w_{M-1}[f] \end{bmatrix} = \sqrt{\frac{F}{M}} \tilde{h}^*[f] R, \quad (6)$$

$$f = 0, 1, \ldots, F-1,$$

such that the following expression of the PSPA power constraint is met:

$$\sum_{f=0}^{F-1} \|w_m[f]\|^2 = \frac{F}{M}, \, m = 1, \ldots, M \quad (7)$$

where $W[f]$ is a vector composed of the sets of complex weights and is given by $W^T[f]=[w_0[f] \, w_1[f] \ldots w_{M-1}[f]]$, $\tilde{h}[f]$ is the M×1 channel vector expressed in Eq. 1 (the complex conjugate of which is used here for exemplary purposes only as the non-normalized sets of beam weights), F is the number of tones in an OFDM symbol, and R is a M×M matrix whose m-th diagonal entry is given by:

$$r_m = \frac{1}{\sqrt{\sum_{f=0}^{F-1} |\tilde{h}_m[f]|^2}}, \quad (8)$$

Under the PTPA power constraint, the sets of complex weights, $w_0[f]$ through $w_{M-1}[f]$, are normalized such that the power of each of the tones of the OFDM symbols transmitted from antennas 105-1 through 105-M is constrained to be a constant. The complex sets of weights, $w_0[f]$ through $w_{M-1}[f]$, normalized under the PSPA power constraint can be expressed, for example, as a vector $W[f]$ as follows:

$$W[f] = \begin{bmatrix} w_0[f] \\ \vdots \\ w_{M-1}[f] \end{bmatrix} = \sqrt{\frac{1}{M}} \tilde{h}^*[f] R, \quad (9)$$

$$f = 0, 1, \ldots, F-1$$

such that the following expression of the PTPA power constraint is met:

$$|w_m[d]|^2 = 1, m=1, \ldots, M \quad (10)$$

where $W[f]$ is a vector composed of the sets of complex weights and is given by $W^T[f]=[w_0[f]w_1[f] \ldots w_{M-1}[f]]$, $\tilde{h}[f]$ is the M×1 channel vector expressed in Eq. 1 (the complex conjugate of which is used here for exemplary purposes only as the non-normalized sets of beam weights), F is the number of tones in an OFDM symbol, and R is a M×M matrix whose m-th diagonal entry is given by:

$$r_m = \frac{1}{|w_m[f]|} \quad (11)$$

Discussed below is an apparatus and method for selecting one of these four different power constraints (i.e., the PS, PT, PSPA, and PTPA power constraints), under which the sets of complex weights, $w_0[f]$ through $w_{M-1}[f]$, are normalized, based on the code rate used to encode the information carried by the tones of the OFDM symbols transmitted by wireless transmitter 200. More specifically, the apparatus and method select the power constraint to be used based on the code rate in such a way as to improve the bit error rate (BER) of the decoded transmit signal at base station 103. In instances where the code rate is made adaptive using AMC 221, the different power constraint used can be further made adaptive by the apparatus and method described below.

It should be noted that the apparatus and method described below can be used in other devices with multiple transmit antennas, besides mobile station 101 and transmitter 200, in order to improve the rate at which data can be transmitted to an intended receiver. For example, the method and apparatus can be implemented in base station 103 to improve the rate at which it can transmit data to mobile station 101.

4. Example Apparatus

Figure 3:
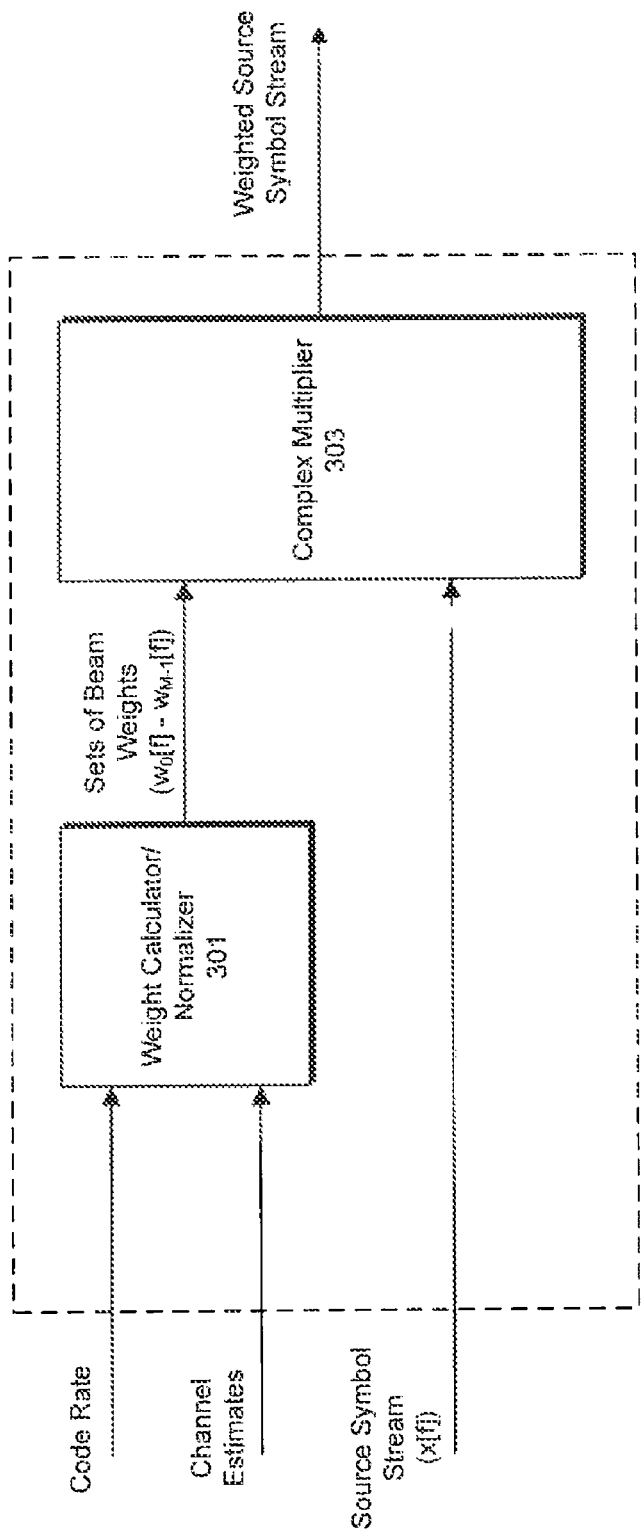
FIG. 3 illustrates an exemplary beamformer in accordance with embodiments of present invention.

Turning now to FIG. 3, an exemplary implementation of beamformer 207 is illustrated. Beamformer 207 specifically includes a weight calculator and normalizer (weight calculator/normalizer) 301 and a complex multiplier 303.

In operation, weight calculator/normalizer 301 is configured to determine the sets of beam weights, $w_0[f]$ through $w_{M-1}[f]$, and normalize them under different power constraints, to ensure a fixed overall transmit power from transmitter 200. For example, and in one embodiment, weight calculator/normalizer 301 can determine the non-normalized beam weights as the complex conjugate of the M×1 channel vector expressed in Eq. 1 above. The particular power constraint used by weight calculator/normalizer 301 can be determined based on the code rate (i.e., the code rate used to encode the information carried by the tones of the OFDM symbols) in such a way as to improve the BER or BLER of the decoded transmit signal at base station 103.

In one embodiment, assuming the fixed overall transmit power of transmitter 200 can be shared among antennas 105-1 through 105-M in some variable proportion, then the sets of complex weights, $w_0[f]$ through $w_{M-1}[f]$, are normalized by weight calculator/normalizer 301 under the per-symbol (PS) power constraint if the code rate is below a threshold value and under the per-tone (PT) power constraint if the code rate is above the threshold value. The PS power constraint and PT power constraint were described above.

In another embodiment, assuming that the fixed overall transmit power of transmitter 200 cannot be shared among antennas 105-1 through 105-M in some variable proportion (i.e., each antenna is constrained to a fixed proportion of the transmit power available at transmitter 200), then the sets of complex weights, $w_0[f]$ through $w_{M-1}[f]$, are normalized by weight calculator/normalizer 301 under the per-symbol, per-antenna (PSPA) power constraint if the code rate is below a threshold value and a per-tone, per-antenna (PTPA) power constraint if the code rate is above the threshold value. The PSPA power constraint and the PTPA power constraint were described above.

In general, the threshold value can be determined based on, for example, the order of the constellation(s) used to determine the F streams of complex symbols, x[0] through x[F−1], and/or the rate at which the source symbols modulate the tones of an OFDM symbol (referred to as the source symbol rate), and/or current conditions of the channel (e.g., expected noise and interference levels) used to carry a transmit signal from transmitter 200 to base station 103.

After the sets of complex weights, $w_0[f]$ through $w_{M-1}[f]$, have been normalized by weight calculator/normalizer 301, complex multiplier 303 is configured to multiply each of the normalized sets of complex weights, $_0[f]$ through $w_{M-1}[f]$, by the streams of complex symbols, x[f], where f=0, 1, . . . , F−1.

It should be noted that the exemplary implementation of beamformer 207 illustrated in FIG. 3 can be implemented in transmitters other than transmitter 200 illustrated in FIG. 2. In addition, it should be noted that the normalized sets of complex weights, $w_0[f]$ through $w_{M-1}[f]$, can be applied to the tones of the OFDM symbols in ways other than through the use of a complex multiplier, such as complex multiplier 303 illustrated in FIG. 3.

5. Example Method

Figure 4:
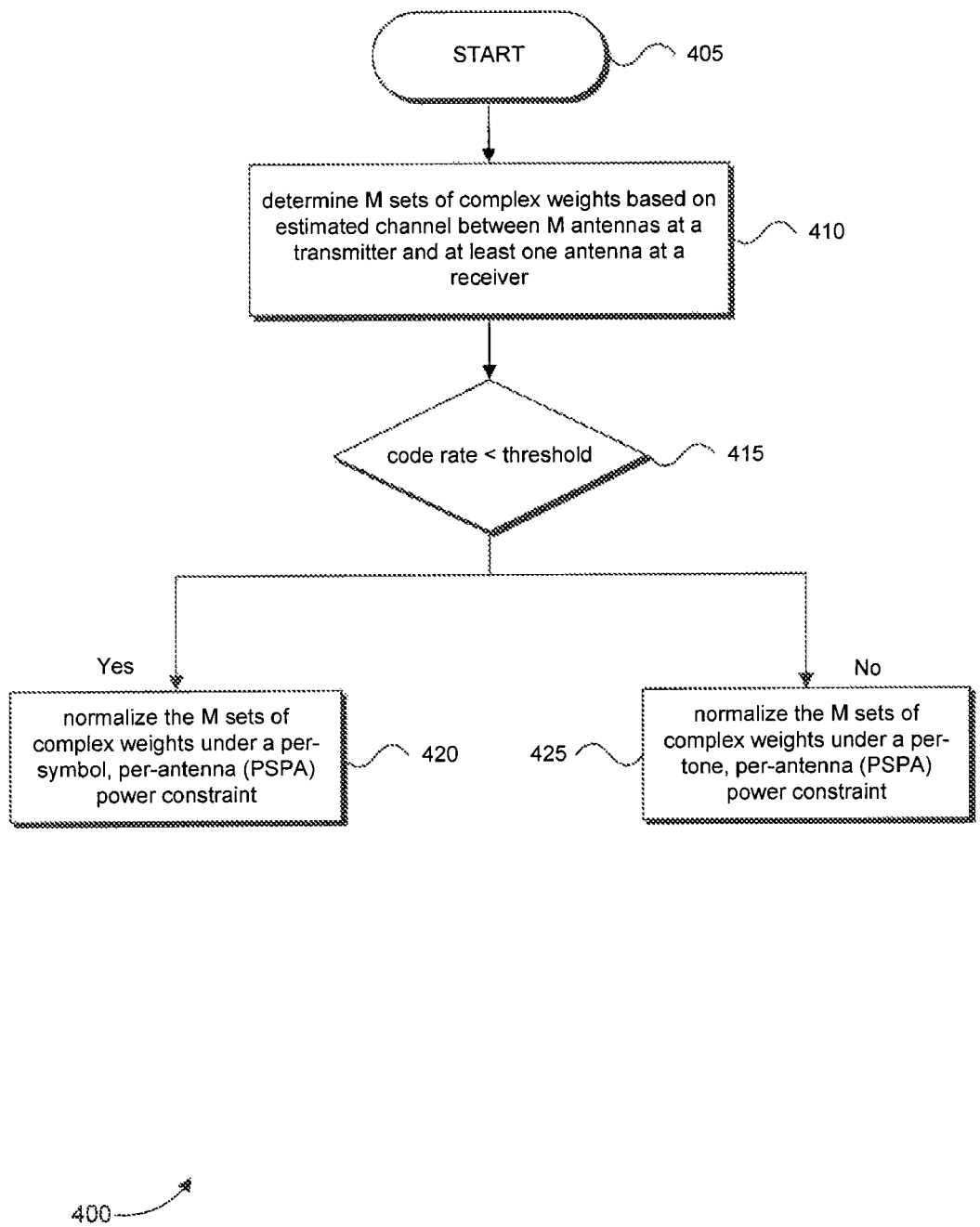
FIG. 4 illustrates a flowchart of an exemplary method for normalizing beamforming weights when an overall transmit power cannot be shared in some variable proportion among the transmit antennas at a transmitter, in accordance with embodiments of present invention.

FIG. 4 depicts a flowchart 400 of a method for normalizing complex sets of beam weights when an overall transmit power cannot be shared in some variable proportion among transmit antennas at a transmitter, in accordance with embodiments of the present invention. The method of flowchart 400 can be implemented by beamformer 207 as described above in reference to FIGS. 2 and 3. However, it should be noted that the method can be implemented by other systems and components as well. It should be further noted that some of the steps of flowchart 400 do not have to occur in the order shown in FIG. 4.

The method of flowchart 400 begins at step 405 and transitions to step 410. At step 410, M sets of complex weights are determined based on an estimated channel between M antennas at a transmitter, such as transmitter 200 illustrated in FIG. 2, and at least one antenna at an intended receiver. The M sets of complex weights are determined and used to perform transmit beamforming at the transmitter to improve the SINR at the receiver.

At step 415, a code rate used to encode the information carried by symbols of the transmit signal is compared to a threshold value. In general, the threshold value can be determined based on, for example, the order of the constellation(s) used to modulate the source symbols carried by the transmit signal, and/or the rate at which the source symbols modulate the tones of an OFDM symbol (referred to as the source symbol rate), and/or current conditions of the channel (e.g., expected noise and interference levels) used to carry a signal from the transmitter to the intended receiver, the frequency selectivity of the channel used to carry a signal from the transmitter to the intended receiver (obtained, for example, by doing tone correlations on embedded pilot symbols in an OFDM symbol), and/or the delay spread of the channel used to carry a signal from the transmitter to the intended receiver (obtained, for example, by measuring the power delay profile of the channel).

Assuming the code rate is less than the threshold value step 415, flowchart 400 transitions to step 420. At step 420, the sets of complex weights are normalized under the per-symbol, per-antenna (PSPA) power constraint. The PSPA power constraint was described above.

Assuming the code rate is greater than the threshold value step 415, flowchart 400 transitions to step 425. At step 425, the sets of complex weights are normalized under the per-antenna (PTPA) power constraint if the code rate is above the threshold value. The PTPA power constraint was described above.

Figure 5:
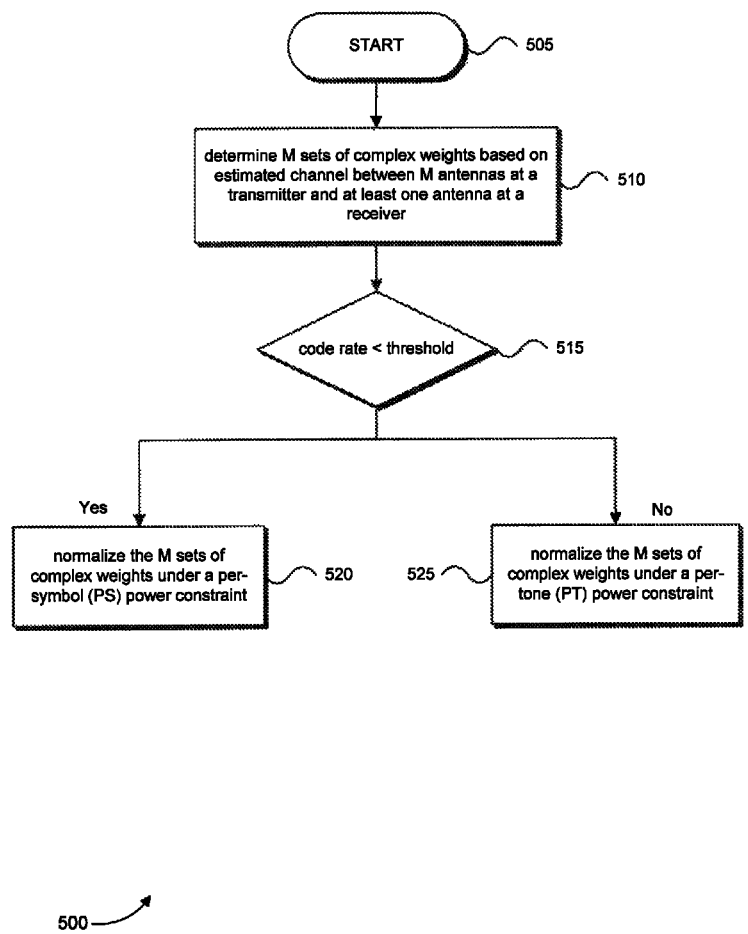
FIG. 5 illustrates a flowchart of an exemplary method for normalizing beamforming weights when an overall transmit power can be shared in some variable proportion among the transmit antennas at a transmitter, in accordance with embodiments of present invention.

FIG. 5 depicts a flowchart 500 of a method for normalizing complex sets of beam weights when an overall transmit power can be shared in some variable proportion among transmit antennas at a transmitter, in accordance with embodiments of the present invention. The method of flowchart 500 can be implemented by beamformer 207 as described above in reference to FIGS. 2 and 3. However, it should be noted that the method can be implemented by other systems and components as well. It should be further noted that some of the steps of flowchart 500 do not have to occur in the order shown in FIG. 5.

The method of flowchart 500 begins at step 505 and transitions to step 510. At step 510, M sets of complex weights are determined based on an estimated channel between M antennas at a transmitter, such as transmitter 200 illustrated in FIG. 2, and at least one antenna at an intended receiver. The M sets of complex weights are determined and used to perform transmit beamforming at the transmitter to improve the SINR at the receiver.

At step 515, a code rate used to encode the information carried by symbols of the transmit signal is compared to a threshold value. In general, the threshold value can be determined based on, for example, the order of the constellation(s) used to modulate the source symbols carried by the transmit signal, and/or the rate at which the source symbols modulate the tones of an OFDM symbol (referred to as the source symbol rate), and/or current conditions of the channel (e.g., expected noise and interference levels) used to carry a signal from the transmitter to the intended receiver, and/or the frequency selectivity of the channel used to carry a signal from the transmitter to the intended receiver (obtained, for example, by doing tone correlations on embedded pilot symbols in an OFDM symbol), and/or the delay spread of the channel used to carry a signal from the transmitter to the intended receiver (obtained, for example, by measuring the power delay profile of the channel).

Assuming the code rate is less than the threshold value step 515, flowchart 500 transitions to step 520. At step 520, the sets of complex weights are normalized under the per-symbol (PS) power constraint. The PS power constraint was described above.

Assuming the code rate is greater than the threshold value step 515, flowchart 500 transitions to step 525. At step 525, the sets of complex weights are normalized under the per-antenna (PT) power constraint if the code rate is above the threshold value. The PT power constraint was described above.

6. Example Computer System Implementation

It will be apparent to persons skilled in the relevant art(s) that various elements and features of the present invention, as described herein, can be implemented in hardware using analog and/or digital circuits, in software, through the execution of instructions by one or more general purpose or special-purpose processors, or as a combination of hardware and software.

Figure 6:
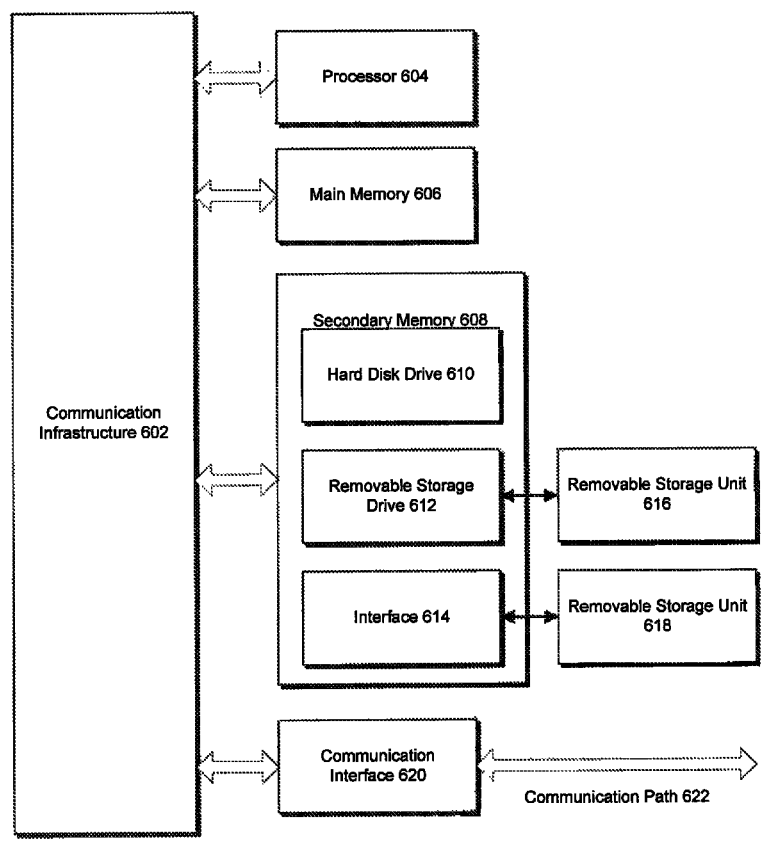
FIG. 6 illustrates an example computer system that can be used to implement aspects of the present invention.

The following description of a general purpose computer system is provided for the sake of completeness. Embodiments of the present invention can be implemented in hardware, or as a combination of software and hardware. Consequently, embodiments of the invention may be implemented in the environment of a computer system or other processing system. An example of such a computer system 600 is shown in FIG. 6. All of the modules depicted in FIGS. 2 and 3 (e.g., encoder 201, interleaver 203, modulation mapper 205, beamformer 207, etc.), with the exception of DAC and TX RF modules 217-1 through 217-N, can execute on one or more distinct computer systems 600. Furthermore, each of the steps of the flowcharts depicted in FIGS. 4 and 5 can be implemented on one or more distinct computer systems 600.

Computer system 600 includes one or more processors, such as processor 604. Processor 604 can be a special purpose or a general purpose digital signal processor. Processor 604 is connected to a communication infrastructure 602 (for example, a bus or network). Various software implementations are described in terms of this exemplary computer system. After reading this description, it will become apparent to a person skilled in the relevant art(s) how to implement the invention using other computer systems and/or computer architectures.

Computer system 600 also includes a main memory 606, preferably random access memory (RAM), and may also include a secondary memory 608. Secondary memory 608 may include, for example, a hard disk drive 610 and/or a removable storage drive 612, representing a floppy disk drive, a magnetic tape drive, an optical disk drive, or the like. Removable storage drive 612 reads from and/or writes to a removable storage unit 616 in a well-known manner. Removable storage unit 616 represents a floppy disk, magnetic tape, optical disk, or the like, which is read by and written to by removable storage drive 612. As will be appreciated by persons skilled in the relevant art(s), removable storage unit 616 includes a computer usable storage medium having stored therein computer software and/or data.

In alternative implementations, secondary memory 608 may include other similar means for allowing computer programs or other instructions to be loaded into computer system 600. Such means may include, for example, a removable storage unit 618 and an interface 614. Examples of such means may include a program cartridge and cartridge interface (such as that found in video game devices), a removable memory chip (such as an EPROM, or PROM) and associated socket, a thumb drive and USB port, and other removable storage units 618 and interfaces 614 which allow software and data to be transferred from removable storage unit 618 to computer system 600.

Computer system 600 may also include a communications interface 620. Communications interface 620 allows software and data to be transferred between computer system 600 and external devices. Examples of communications interface 620 may include a modem, a network interface (such as an Ethernet card), a communications port, a PCMCIA slot and card, etc. Software and data transferred via communications interface 620 are in the form of signals which may be electronic, electromagnetic, optical, or other signals capable of being received by communications interface 1420. These signals are provided to communications interface 620 via a communications path 622. Communications path 622 carries signals and may be implemented using wire or cable, fiber optics, a phone line, a cellular phone link, an RF link and other communications channels.

As used herein, the terms "computer program medium" and "computer readable medium" are used to generally refer to tangible storage media such as removable storage units 616 and 618 or a hard disk installed in hard disk drive 610. These computer program products are means for providing software to computer system 600.

Computer programs (also called computer control logic) are stored in main memory 606 and/or secondary memory 608. Computer programs may also be received via communications interface 620. Such computer programs, when executed, enable the computer system 600 to implement the present invention as discussed herein. In particular, the computer programs, when executed, enable processor 604 to implement the processes of the present invention, such as any of the methods described herein. Accordingly, such computer programs represent controllers of the computer system 600. Where the invention is implemented using software, the software may be stored in a computer program product and loaded into computer system 600 using removable storage drive 612, interface 614, or communications interface 620.

In another embodiment, features of the invention are implemented primarily in hardware using, for example, hardware components such as application-specific integrated circuits (ASICs) and gate arrays. Implementation of a hardware state machine so as to perform the functions described herein will also be apparent to persons skilled in the relevant art(s).

7. Conclusion

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

In addition, while various embodiments have been described above, it should be understood that they have been presented by way of example only, and not limitation. It will be understood by those skilled in the relevant art(s) that various changes in form and details can be made to the embodiments described herein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A beamformer comprising:
a weight calculator configured to determine M sets of weights based on an estimated channel between M antennas at a transmitter and an antenna at a receiver, wherein each of the M sets of weights corresponds to a different one of the M antennas at the transmitter and is used to weight F source symbols for transmission from the different one of the M antennas at the transmitter to which the set of weights corresponds, and wherein M and F are integers; and
a normalizer configured to normalize the M sets of weights under a power constraint determined based on a code rate used to encode information mapped to the F source symbols, wherein:
the normalizer is configured to normalize the M sets of weights under a per-symbol, per-antenna (PSPA) power constraint if the code rate is below a threshold value, and
the normalizer is configured to normalize the M sets of weights under a per-tone, per-antenna (PTPA) power constraint if the code rate is above the threshold value.

2. The beamformer of claim 1, wherein the threshold value is determined based on a signal to noise ratio, a frequency selectivity or a delay spread of the estimated channel.

3. The beamformer of claim 1, wherein the code rate is adaptive.

4. The beamformer of claim 1, wherein the antenna at the receiver is a virtualized antenna.

5. The beamformer of claim 1, wherein the transmitter is located at a user device and the receiver is located at a base station.

6. The beamformer of claim 5, wherein the user device and the base station are configured to operate in accordance with at least one of an Institute of Electrical and Electronics Engineers 802.16e standard and a Third Generation Partnership Project Long Term Evolution standard.

7. A method comprising:
determining M sets of weights based on an estimated channel between M antennas at a transmitter and an antenna at a receiver, wherein each of the M sets of weights corresponds to a different one of the M antennas at the transmitter and is used to weight F source symbols for transmission from the different one of the M antennas at the transmitter to which the set of weights corresponds, and wherein M and F are integers; and
normalizing the M sets of weights under a power constraint determined based on a code rate used to encode information mapped to the F source symbols, wherein normalizing the M sets of weights further comprises:
normalizing the M sets of weights under a per-symbol, per-antenna (PSPA) power constraint if the code rate is below a threshold value; and
normalizing the M sets of weights under a per-tone, per-antenna (PTPA) power constraint if the code rate is above the threshold value.

8. The method of claim 7, further comprising: determining the threshold value based on a signal to noise ratio, a frequency selectivity or a delay spread of the estimated channel.

9. The method of claim 7, wherein the code rate is adaptive.

10. The method of claim 7, wherein the antenna at the receiver is a virtualized antenna.

11. The method of claim 7, wherein the transmitter is located at a user device and the receiver is located at a base station.

12. The method of claim 11, wherein the user device and the base station are configured to operate in accordance with at least one of an Institute of Electrical and Electronics Engineers 802.16e standard and a Third Generation Partnership Project Long Term Evolution standard.

13. A beamformer comprising:
a weight calculator configured to determine M sets of weights based on an estimated channel between M antennas at a transmitter and an antenna at a receiver, wherein each of the M sets of weights corresponds to a different one of the M antennas at the transmitter and is used to weight F source symbols for transmission from the different one of the M antennas at the transmitter to which the set of weights corresponds, and wherein M and F are integers; and
a normalizer configured to normalize the M sets of weights under a power constraint, wherein the power constraint is selected based on a code rate used to encode information mapped to the F source symbols, wherein:

the normalizer is configured to normalize the M sets of weights under a per-symbol, per-antenna (PSPA) power constraint if the code rate is below a threshold value, and the normalizer is configured to normalize the M sets of weights under a per-tone, per-antenna (PTPA) power constraint if the code rate is above the threshold value.

14. A beamformer comprising:

a weight calculator configured to determine M sets of weights based on an estimated channel between M antennas at a transmitter and an antenna at a receiver, wherein each of the M sets of weights corresponds to a different one of the M antennas at the transmitter and is used to weight F source symbols for transmission from the different one of the M antennas at the transmitter to which the set of weights corresponds, and wherein M and F are integers; and a normalizer configured to normalize the M sets of weights under a power constraint determined based on a code rate used to encode information mapped to the F source symbols, wherein:

the normalizer is configured to normalize the M sets of weights under a per-symbol (PS) power constraint if the code rate is below a threshold value, and the normalizer is configured to normalize the M sets of weights under a per-tone (PT) power constraint if the code rate is above the threshold value.

15. The beamformer of claim 14, wherein the threshold value is determined based on a signal to noise ratio, a frequency selectivity or a delay spread of the estimated channel.

16. A method comprising:

determining M sets of weights based on an estimated channel between M antennas at a transmitter and an antenna at a receiver, wherein each of the M sets of weights corresponds to a different one of the M antennas at the transmitter and is used to weight F source symbols for transmission from the different one of the M antennas at the transmitter to which the set of weights corresponds, and wherein M and F are integers; and normalizing the M sets of weights under a power constraint determined based on a code rate used to encode information mapped to the F source symbols, wherein normalizing the M sets of weights further comprises:

normalizing the M sets of weights under a per-symbol (PS) power constraint if the code rate is below a threshold value; and normalizing the M sets of weights under a per-tone (PT) power constraint if the code rate is above the threshold value.

17. The method of claim 16, further comprising: determining the threshold value based on a signal to noise ratio, a frequency selectivity or a delay spread of the estimated channel.

* * * * *